A. W. AITKEN.
TRANSMISSION BEARING FOR ROAD ROLLERS.
APPLICATION FILED DEC. 10, 1913.
1,132,544.
Patented Mar. 23, 1915
3 SHEETS—SHEET 1.
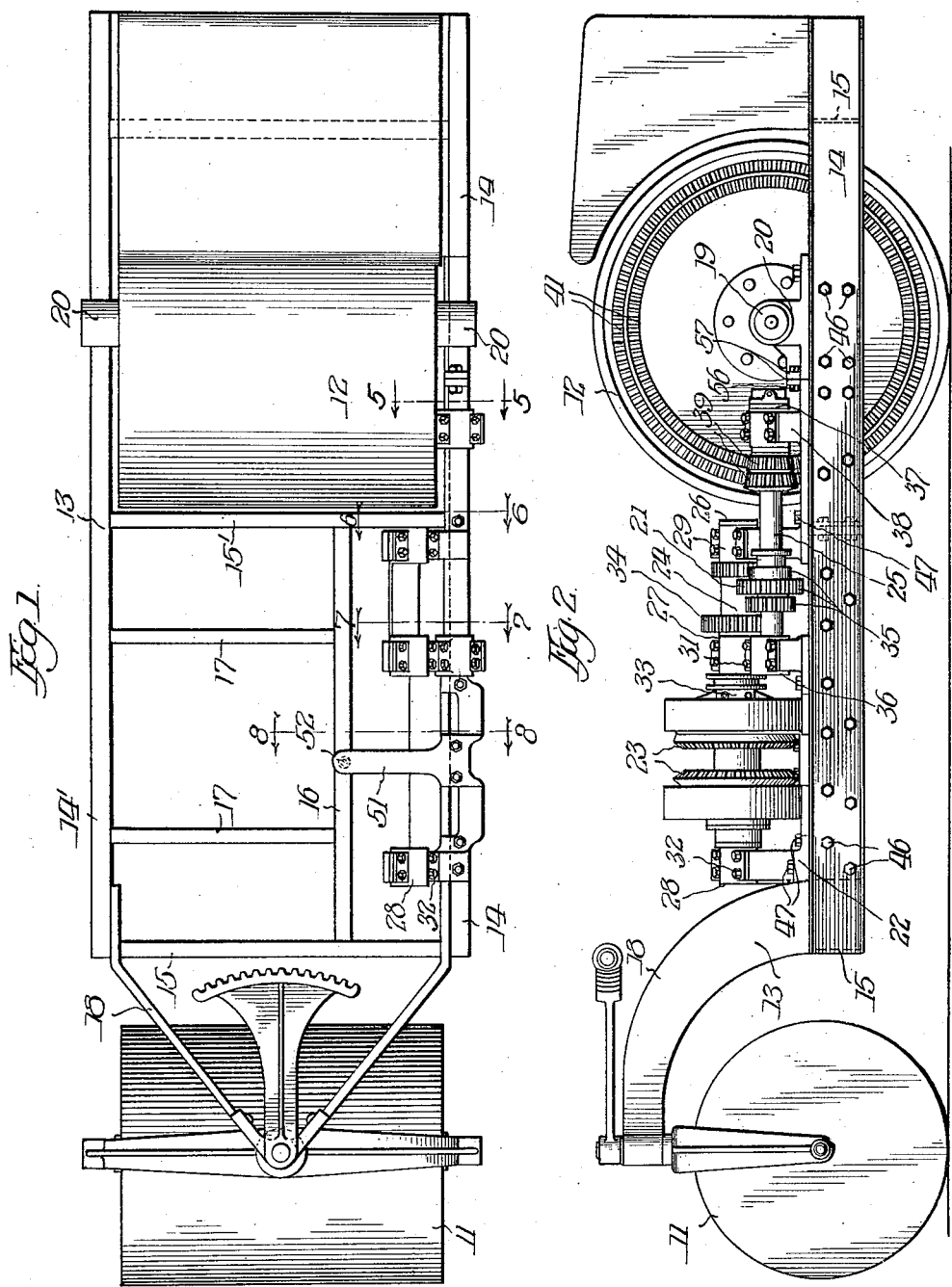

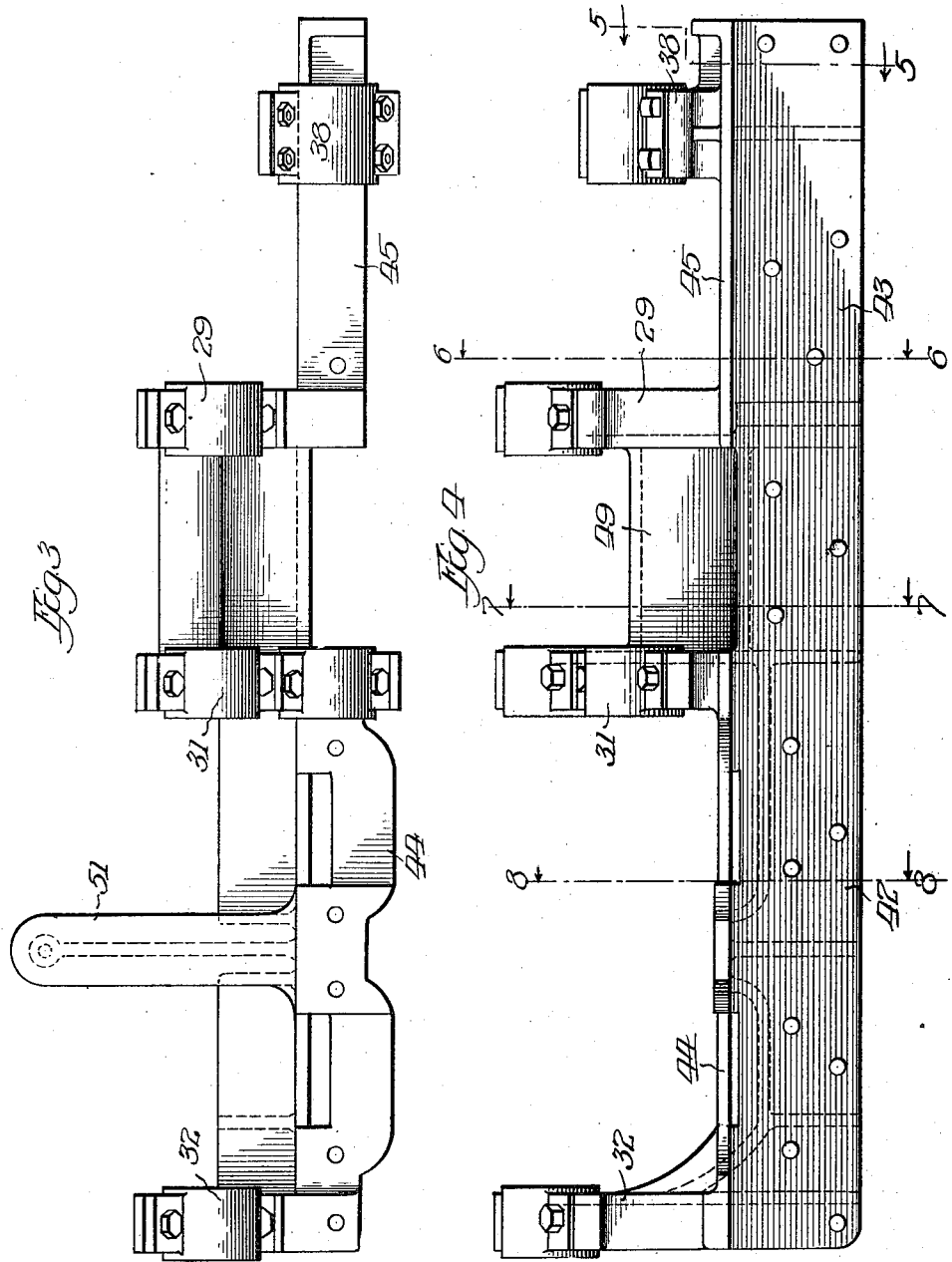

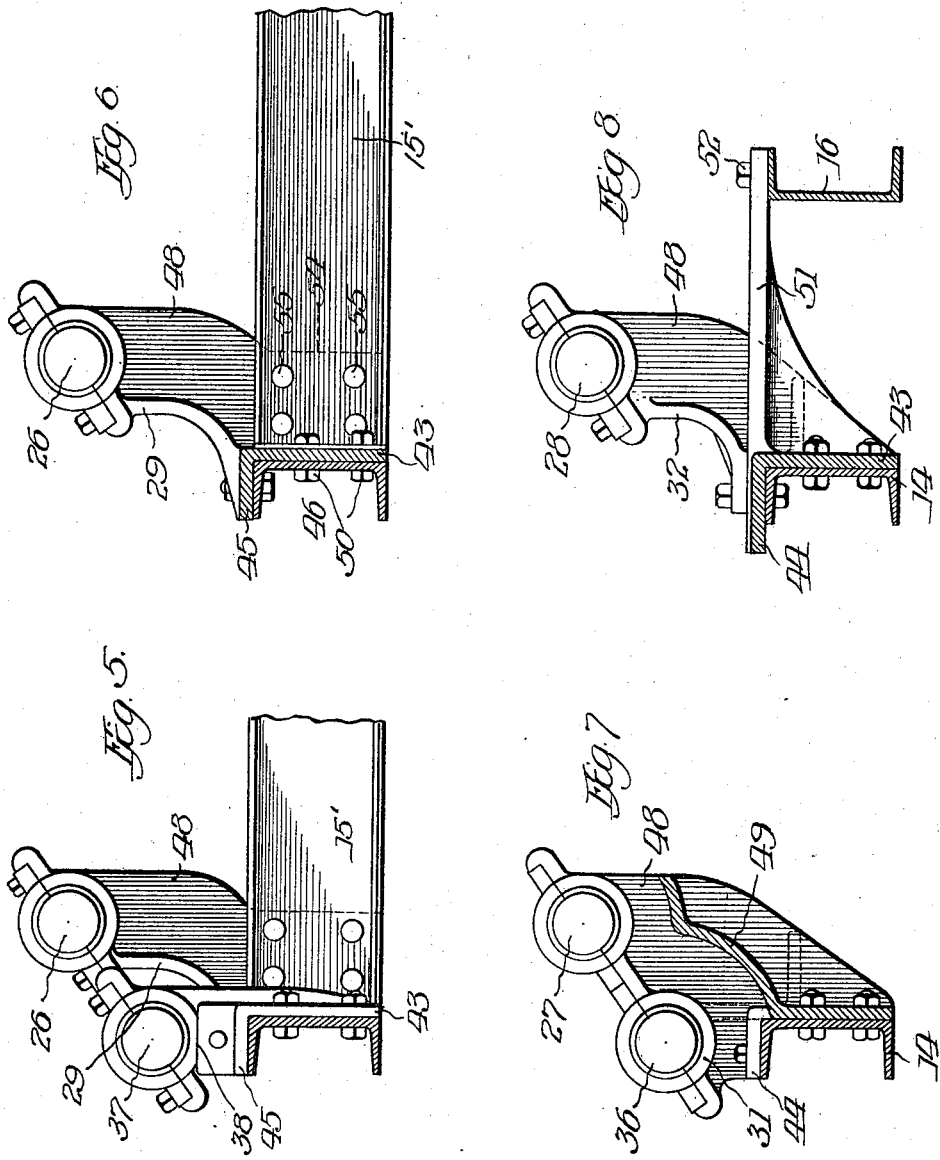

UNITED STATES PATENT OFFICE.

ANDREW W. AITKEN, OF CHICAGO, ILLINOIS, ASSIGNOR TO AUSTIN MANUFACTURING COMPANY, OF CHICAGO, ILLINOIS, A CORPORATION OF ILLINOIS.

TRANSMISSION-BEARING FOR ROAD-ROLLERS.

1,132,544. Specification of Letters Patent. Patented Mar. 23, 1915.

Application filed December 10, 1913. Serial No. 805,667.

*To all whom it may concern:*

Be it known that I, ANDREW W. AITKEN, a citizen of the United States, residing at Chicago, in the county of Cook and State of Illinois, have invented certain new and useful Improvements in Transmission-Bearings for Road-Rollers, of which the following is a specification.

A principal object of my present invention is to improve the mounting of the power transmission in road rollers and other moving vehicles wherein the transmission is subject to severe shocks and jars in use, so that an efficient and durable road roller or similar vehicle is provided.

To this end my invention contemplates the provision of a one-piece bearing bracket for the driving elements and all the transmission parts, which will not only result in perfect alinement of the bearings for the various shafts but which will also materially stiffen the main frame of the vehicle, thereby permitting the main frame to be constructed of relatively lighter material than is possible where the frame itself must supply substantially all of the stiffening of the structure.

Other objects and advantages of the invention will be apparent as it is better understood from the following description when considered in connection with the accompanying drawings, illustrating a preferred embodiment thereof.

On the drawings, Figure 1 is a top plan view of a road roller provided with a bearing for the transmission and driving members embodying my invention with the transmission parts removed; Fig. 2 is a side elevation of the same, showing the transmission and driving members in position in the bearing; Fig. 3 is an enlarged top plan view of the bearing disclosed in Figs. 1 and 2, Fig. 4 is a side elevation of the same; Figs. 5, 6, 7 and 8 are transverse enlarged vertical sections taken on the lines 5—5, 6—6, 7—7 and 8—8, respectively, in Figs. 1 and 4.

For the purpose of illustrating my invention I have shown it embodied in a tandem roller consisting primarily of a forward or steering roller 11, a rear and heavier roller 12 and a main frame 13 connecting the same. In the present instance this frame comprises the principal elements listed and arranged as follows: A pair of longitudinally disposed channel irons forming side bars 14, 14', a pair of channel irons forming end bars 15 extending between the side bars and fastened at their ends to the side bars, a channel bar 15' arranged in parallelism with the end bars just forwardly of the rear roller 12, and supported from the side bars, and a longitudinal bar 16 arranged intermediate the side bars and secured at its ends to the end bar 15 at the front of the frame and to the bar 15' in front of the roller 12. The longitudinal intermediate bar 16 is preferably connected with the side bar 14' by bars 17 extending between the two, upon which a suitable source of motive power (not shown) may be supported.

The front end of the frame is supported from the forward roller by a yoke 18 and the rear end is suspended from the axle 19 of the roller 12 by brackets 20. The transmission generally indicated at 21 is mounted upon the side bar 14 in a one-piece bracket member 22 constructed in accordance with my invention. This bracket member not only carries the transmission 21 but carries also driving members 23 which receive power in any preferred manner from any suitable source of motive power. The transmission in the present instance consists of a pair of parallelly arranged shafts 24 and 25, the shaft 24 being held in bearings 26, 27 and 28 provided with arms 29, 31 and 32 on the bracket member. The driving members 23 are mounted loosely on the shaft 24 between the bearings 31 and 32 and are adapted to actuate the transmission by a suitable clutch 33. A number of gears 34 of varying diameters are locked upon the shaft 24 between the bearings 29 and 31 and these gears are engageable by companion gears 35 mounted on the shaft 25 and slidable longitudinally thereof to permit the companion gears to singly engage the gears 34 and impart movement at desired speeds to the shaft 25. The ends of the shaft 25 are disposed through bearings 36 and 37 embracing the ends of the shaft and provided one in the arm 31 and the other in an arm 38 disposed opposite the end of the roller 12 and adjacent the bearing bracket 20 of the shaft 19 of the roller. The shaft 25 imparts movement to the roller through beveled gears 39 which mesh with suitable teeth 41 cut in the adjacent end of the roller 12.

As will be seen from viewing Figs. 3 and 4 the arms 29, 31, 32 and 38 are all integral with the body portion 42 of the bracket member. This body portion 42 comprises a wide vertically disposed flange 43 and a pair of horizontal flanges 44 and 45, the horizontal flanges being adapted to rest upon the upper surface of the channel iron forming the member 14 and the vertical flange 43 being adapted to rest against the inner unbroken face of the channel iron to which it is secured by a plurality of bolts, rivets or the like 46 disposed at appropriate intervals through the bracket member and through the web of the channel iron. The horizontal flanges 44 and 45 may also be secured to the channel iron by bolts, rivets or the like 47 disposed through the upper flange of the channel iron and through the flanges 44 and 45 at appropriately spaced intervals longitudinally of the bracket member.

The bearings 26, 27 and 28 are located in the upper ends of the arms 29, 31 and 32 (Figs. 5 to 8) and these arms extend upwardly and rearwardly from the body portion of the bracket member and are reinforced by suitable webs 48. The arm 38 (Fig. 5) extends directly upwardly above the flange 45 and the bearing 36 in the arm 31 (Fig. 7) is located in longitudinal alinement with the bearing 37 so that the shaft 24, which is disposed through the bearings 26, 27 and 28, is located above and inwardly of the shaft 25, which is disposed through the bearings 36 and 37. The horizontal flange 44 extends between the arms 31 and 32 and the horizontal flange 45 between the arms 29 and 38, the arms 29 and 31 being connected by a longitudinally disposed web 49 communicating at its ends with the webs 48 of these arms. Beneath the driving members 23 and consequently between the arms 31 and 32 an integral reinforcing arm 51 (Figs. 1 and 8) extends inwardly of the main frame 13 and is secured at its inner end to the intermediate longitudinal bar 16 by any suitable fastening at 52. A second reinforcing arm 54 (Fig. 6) extends inwardly adjacent the flat face of the channel iron 15′ and is secured thereto by bolts or other suitable fastening means 55 passing through the channel iron and through the arm 54, so that the arm 54 connects the adjacent end of the channel iron 15′ with the side bar 14, the other end of the channel iron 15′ being directly connected in any suitable manner with the side bar 14′.

As the bracket member 22 is in one piece little opportunity is afforded the bearings to work out of alinement during the life of the road roller and no adjustment is necessary to perfect their alinement when the machine is assembled. The arms 51 and 54 reduce materially the effect of any torsional or bending forces felt by the bearing while the roller is in use and the effect of these forces is further reduced by stiffening afforded the side bar 14 at the side of the vehicle at which the transmission is located. If desired, the bracket 20, which supports the rear end of the main frame from the axle 19 of the rear roller, may be connected to the end of the bracket member 22 by bolts 56 passing through ears 57 formed on the abutting ends of these parts.

It will be obvious that a frame of relatively light material may be given the required stiffness by the bracket member embodying my invention just described and it will be apparent that various changes may be made in the form, construction and arrangement of the parts without departing from the spirit and scope of the invention or sacrificing any of its material advantages, the form hereinbefore disclosed being merely a preferred embodiment thereof.

I claim:

1. The combination with a frame including side and cross members; of a transmission supporting bracket comprising an integral structure including a plurality of rigidly alined bearings and a body attached to a side member, the body having a lateral portion extending rigidly therefrom and supporting one of the bearings, the lateral portion being connected to and bracing a cross member.

2. The combination with a frame including side and cross members and being provided with a longitudinal member parallel to the side members and connecting certain of said cross members; of a transmission supporting bracket comprising a rigid body connected to one side member of the frame, bearings integral with and rigidly supported from the body, a laterally-extending portion formed rigidly integral with the body and connected to one of the cross members of the frame, and a second laterally extending portion formed rigidly integral with the body and connected to the longitudinal member.

3. The combination with a frame including side and cross members; of a bracket for supporting a transmission provided with a plurality of shafts, said bracket comprising a rigid integral structure including a plurality of series of alined bearings, certain of the bearings in one series being arranged opposite and braced to certain of the bearings in a second series, said bracket being further provided with an integral attaching and bracing member extending from an oppositely disposed pair of the bearings and connected to a cross member of the frame.

ANDREW W. AITKEN.

Witnesses:
J. H. HOCK,
H. J. WAGNER.